Feb. 10, 1953 L. MACKTA 2,628,351
LOW FREQUENCY SIMPLIFIED LORAN SYSTEM
Filed Nov. 14, 1949 3 Sheets-Sheet 1
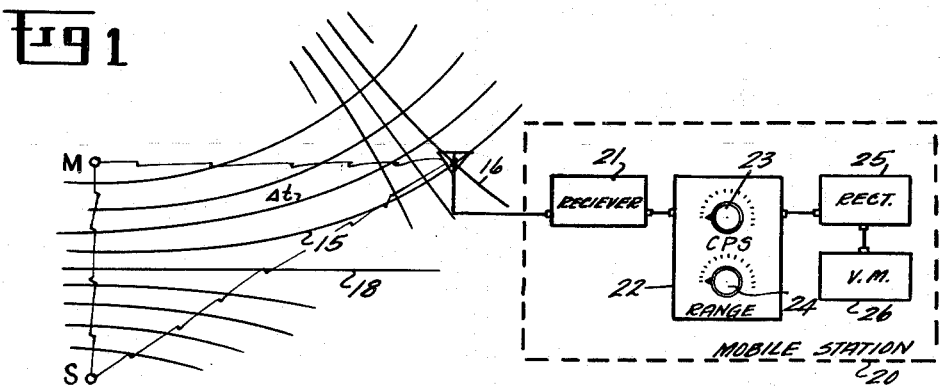
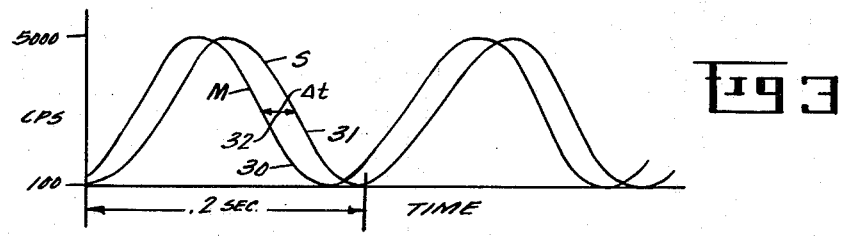
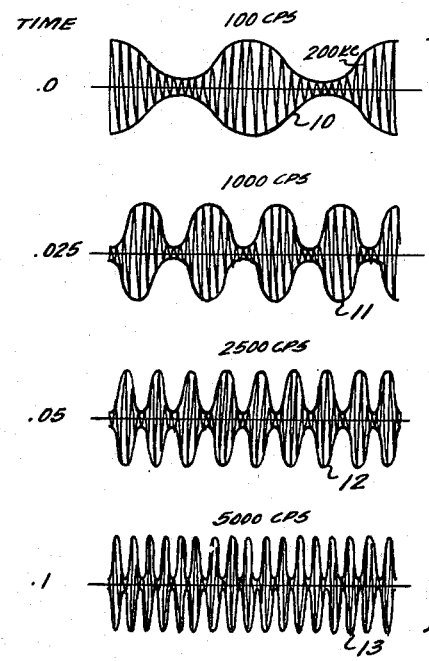
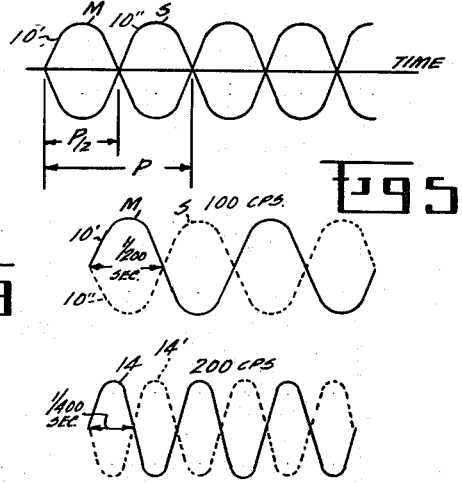
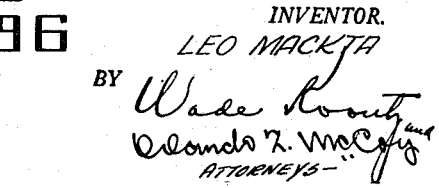
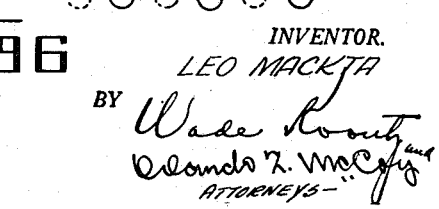
INVENTOR.
LEO MACKTA
BY
ATTORNEYS

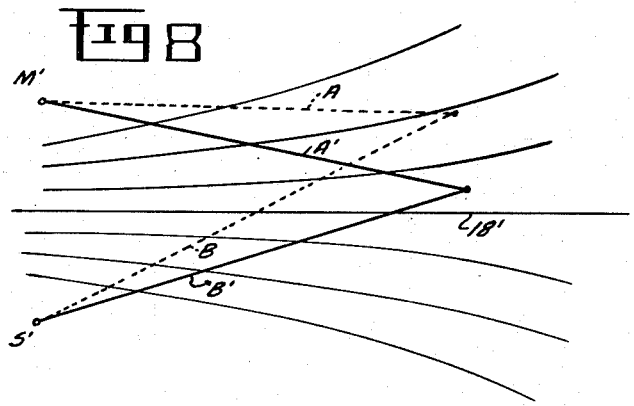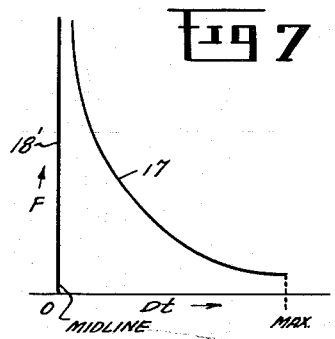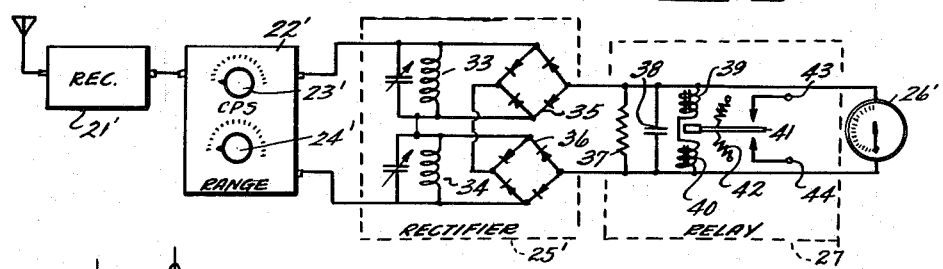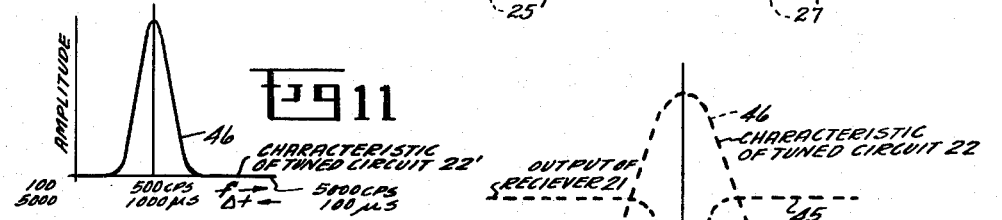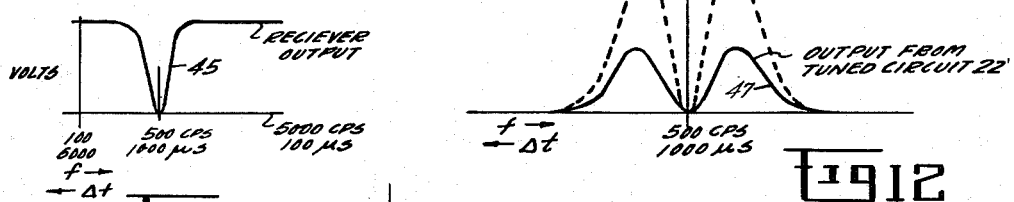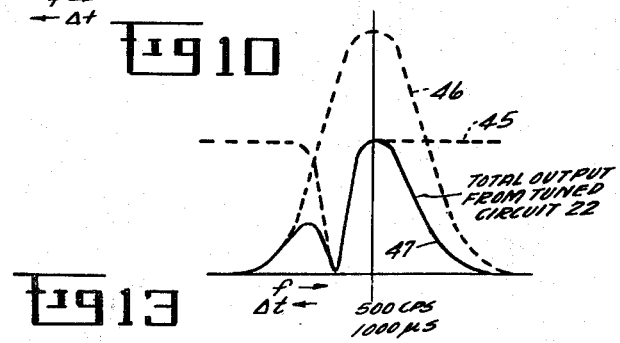

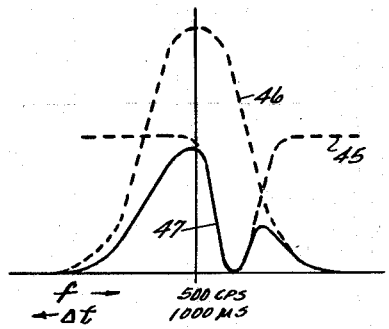
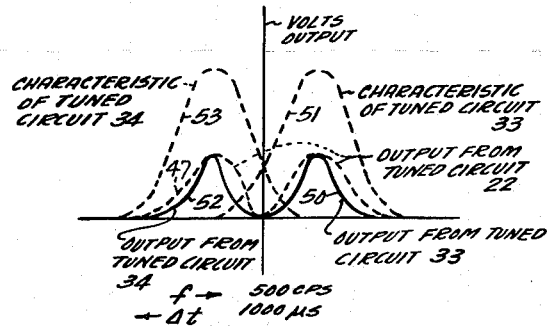
Fig. 14
Fig. 15
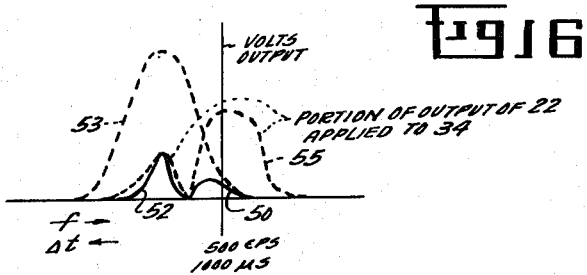
Fig. 16
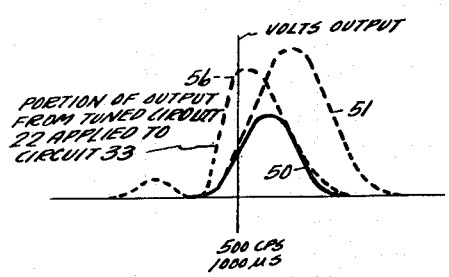
Fig. 17
INVENTOR.
LEO MACKTA

Patented Feb. 10, 1953

2,628,351

UNITED STATES PATENT OFFICE 2,628,351

LOW FREQUENCY SIMPLIFIED LORAN SYSTEM

Leo Mackta, Brooklyn, N. Y.

Application November 14, 1949, Serial No. 127,211

2 Claims. (Cl. 343—104)

(Granted under Title 35, U. S. Code (1952), sec. 266)

The invention described herein may be manufactured and used by or for the Government for governmental purposes without payment to me of any royalty thereon.

This invention pertains to a long range navigation system comprising an equipment and a method for using the equipment with low frequency radio signals for determining the flight path of an airplane, the course of a ship, or the like.

The present long range navigation system, in common with previously known systems, uses a master station and a plurality of slave stations. The present system differs from known previously existing long range navigation or loran systems in that, instead of transmitting signal pulses, the present system transmits as signal a sinusoidal tone that varies in frequency from, for example, 100 cycles per second to 5,000 cycles per second over a period of approximately 0.2 of a second. Transmission of the signal is repetitious. A single side band width of 10 kilocycles is adequate separation between groups of stations.

The audio systems of both the transmitters and the receivers used in the practice of the present invention are substantially flat for the proposed range of 100 to 5,000 cycles per second, or at any particular frequency within that range the phase shifts are equal. A receiver in the mobile station, which may be an aircraft, a ship, or the like, will receive signals transmitted simultaneously by both the master and the slave stations. Corresponding to the time difference of the signals from the master and the slave stations will be a group of frequencies which will be missing from the audio spectrum received at the mobile station.

Illustratively if the mobile station receiver is on a hyperbolic delay line corresponding to 1,000 microsecond delay then the 500 cycles per second signal will be missing completely as a sharp negative pulse, the 1500 cycles per second signal will be missing less sharply, and a 2500 cycle per second signal will be missing still less sharply. The lowest missing frequency will then indicate the particular hyperbolic line of position where the aircraft or other mobile station makes the determination. The total received signal will be composed of the two received audio spectra plus a beat frequency between them due to the difference in frequency at the time they are received, with definite sharp missing portions of the spectrum at those frequencies where the delay time is one-half the periods or where the phase shift produced by the delay is an odd multiple of 180°.

In the making of position determinations at the mobile station, a receiver output is passed through a high Q variable tuned circuit which consists preferably of a plurality of tank circuits containing powdered iron core inductances including or not, as desired, a tuned circuit with a regenerative amplifier. The tuned circuit has as many ranges as are necessary to maintain the high Q value that is desired and to spread the dial length. The proposed frequency range of from 100 cycles per second to 5 kilocycles per second corresponds to delay times of 5,000 microseconds to 100 microseconds with a predetermined delay in the slave station to reduce the indicated 100 microseconds to an actual zero delay time, thus keeping the maximum frequency required down to 5 kilocycles. The output of the tuned circuit is rectified, as by a diode or the like, and is then passed through a capacitance-resistance circuit with illustratively a 0.1 second period, from which it is measured in a sensitive direct current millimeter.

A long period circuit is preferred to insure a steady meter reading. At any one frequency passed through the tuned circuit, the signal obtained will be a series of sharp pulses. The tuned circuit is calibrated immediately before and after use by check points obtained from a multivibrator operated from a crystal having a vibration period at preferably about 100 kilocycles per second or from the basic radio frequency at the transmitter station as obtained from the radio frequency section of the receiver. In the latter event the check points will have to be marked from the corresponding station received.

As the frequency of the tuned audo circuit is varied by the operation of a circuit dial, a constant reading of the output meter will be obtained. This reading may be increased by atmospheric or by random signals. Upon being tuned from the low frequency end, a dip in the output meter will be obtained corresponding to a frequency to which the time difference between signals is one-half the period. Atmospheric effects or random signals will give sporadic indications on the output meter but will not give a steady deflection of the meter indicator, as do other parts of the spectrum. The hand dial of the tuned circuit is calibrated in microseconds delay from which a particular delay line in the family of lines between the stations is positively identified as the location of the mobile station with respect to that pair of stations. A similar reading with respect to a second pair of stations identifies a particular delay line therebetween. The intersection of the two delay lines projected upon the map of the area locates the geographical position of the mobile station.

An object of the present invention is to provide a long range navigational system, equipment and method preferably with a frequency band width of less than 10 kilocycles with a single side band, as compared with the high band width of the older pulse methods.

Another object is to provide a navigation system that minimizes interference and erroneous measurement indications arising from atmospheric electrical phenomena and from effects of random signals in the presence of many of which the proposed system continues to provide accurate measurements.

A further object is to provide a long range navigation system that employs simple electrical circuits, comprising either a built-in crystal or a transmitter frequency through a multivibrator as a standard frequency.

Another object is to provide a long range navigation system embodying a direct reading dial that is calibrated in units of distance and that may be read by an airplane pilot without requiring its interpretation through an electronics operator.

With the above and other objects in view that will be apparent from the following description, an illustrative embodiment of the present invention is shown in the accompanying drawings wherein:

Fig. 1 is a diagrammatic showing of a pair of stations with a hyperbolic system of delay lines indicated therebetween, together with a mobile station containing suitable position determining equipment shown in block diagram;

Fig. 2 represents a constant frequency carrier subjected to audio modulation of representatively increasing frequencies and transmitted simultaneously from both master and slave stations shown in Fig. 1;

Fig. 3 is a pair of sine curves mathematically representing on ordinates of time and frequency, variations in audio modulation impressed upon the carriers at the two transmitting stations in Fig. 1 but displaced in phase by a determinable time difference;

Fig. 4 represents a pair of sine curves displaced 180° in phase with respect to each other to identify a particular delay line in Fig. 1;

Figs. 5 and 6 are pairs of sinusoidal wave shapes of different frequencies for use in the explanation of the theory of operation of the present invention;

Fig. 7 is a curve of the relationship between the audio frequency at which a null is obtained and the time difference between the two signals received at the mobile station shown in Fig. 1;

Fig. 8 is a diagrammatical presentation of the hyperbolic system shown in Fig. 1 used in the explanation of the operation of the present system;

Fig. 9 is a block and schematic diagram of the equipment in the mobile station shown in Fig. 1; and Figs. 10 through 17, inclusive, represent signal aspects during the operation of making a determination with the equipment and method disclosed herein.

In Fig. 1 of the accompanying drawings a master station, indicated by the letter M, continuously maintains sinusoidal signal relations with a slave station, indicated by the letter S. The master station M and the slave station S simultaneously and separately transmit constant frequency carriers of, for example, 200 kilocycle frequency, that as indicated in Fig. 2, are audio modulated sinusoidally over a predetermined frequency band. The time differences of signal travel between the stations M and S to a mobile station 20 separately identify by null pairs of signal receptions, each identifying one only of a plurality of hyperbolic delay lines, of which the line 15 in Fig. 1 is illustrative.

Location establishing equipment in the mobile station 20 comprises a receiver 21 that intercepts signal from the stations M and S and that passes its output to a tuned circuit 22. The tuned circuit 22 is provided with a tuning knob 23 for tuning to a particular frequency and a range switch knob 24 for tuning between a desired plurality of bands.

The tuned circuit 22 operates over a representative frequency range of from 100 to 5,000 cycles per second. The output from the tuned circuit 22 is rectified in a rectifier 25 and is presented as a direct current for being read on a voltmeter 26. A null reading at the voltmeter 26 indicates signal cancellation at a particular hyperbolic delay line identified by the setting of the tuned circuit knobs 23 and 24, such as the line 15, nearest to which the mobile station 20 is located.

The location of the mobile station 20 is established along the hyperbolic line 15 by a second reading of the time difference between the master station M and a second slave station, not shown, but maintaining with the master station M, a second series of hyperbolic delay lines of which the line 16 is representative. These two determinations indicate to the pilot of the aircraft of the mobile station 20 that he is at the intersection of the two lines 15 and 16. The superposition of the two sets of hyperbolae upon a geographical map on which the master station M with its two slave stations are properly positioned provides the pilot with his location geographically at the point where the two lines 15 and 16 intersect.

In Fig. 2 of the drawings separate carriers at 200 kilocycles frequency are separately emitted simultaneously by both the master station M and the slave station S and are illustratively shown to be audio modulated from 100 cycles per second to 5,000 cycles per second over a period of 0.2 of a second. The wave envelope patterns 10, 11, 12 and 13 shown are carrier modulations at increasing frequencies. In the steps shown in Fig. 2: at zero time the audio modulation is 100 cycles per second indicated by the wave envelope pattern 10; twenty-five thousandths of a second later the audio modulation wave pattern 11 will have increased to 1,000 cycles per second; in fifty thousandths of a second the audio modulation wave pattern 12 will have increased to 2500 cycles per second; and in 0.1 second the frequency of the audio modulation wave pattern 13 will have increased to 5,000 cycles per second. This increase in audio modulation frequencies is correspondingly decreased during the next 0.1 second, as indicated in sine curves 30 and 31 in Fig. 3 of the drawings.

A radio linkage is maintained between the master station M and the slave station S that causes the audio modulation of the carrier from the slave station to vary in frequency in accordance with the same function of time as the audio modulation of the carrier from the master station. The radio linkage also causes a constant phase difference to exist between the audio frequency modulations of the master and slave stations at any one time. This phase difference may be zero. In the family of hyperbolae between the stations M and S the difference from any point of a hyperbola to the two foci is a constant.

The two signals from the master station M and slave station S of one pair of stations, are received by the receiver on the aircraft or mobile station 20. The receiver 21 may be an ordinary low frequency receiver used for the reception of amplitude modulated carrier waves in the low frequency band such as, for example, a band of 200 or 400 kilocycles.

The receiver 21 has an output that contains the audio modulated carriers from both the master and the slave stations M and S, respectively, together with modulation products thereof, such as sum and difference frequencies and harmonics of the modulations originally applied to the carriers.

The output from the receiver 21 is applied to the tuned circuit 22. The tuned circuit 22 may be of a parallel resonant type and is tunable over the selected audio range of from 100 to 5,000 cycles per second. A high Q is maintained for the tuned circuit 22 by covering the audio modulation range in a series of steps by means of the range switch 24, that shifts successively in steps over the full range of the tuned circuit.

Null readings on the voltmeter 26 are occasioned by the cancellation of the audio modulation impressed upon the pairs of carriers transmitted from the stations M and S for the particular situation where the audio modulations are 180° out of phase at a particular frequency.

Audio modulation on the carrier and shown in Fig. 2 is expressed graphically as a sine curve in Fig. 3 of the drawings. The sine curve 30, as indicated, is the frequency curve of the audio modulation impressed upon the 200 kilocycle carrier transmitted from the master station M. The sine curve 31, as indicated, is the frequency curve of the modulation impressed upon the 200 kilocycle carrier transmitted from the slave station S. As previously stated, the transmissions of the audio signals occur simultaneously and exactly in phase from the master station M and from the slave station S. With the signals from the master and slave stations transmitted exactly in phase, or with fixed phase differences, there will result at the receiver a delay of the signal from one of the stations relative to the signal from the other station depending upon the difference in the distances traveled by the two signals.

With the receiver 21 of the mobile station 20 positioned with respect to the stations M and S as shown in Fig. 1, the length of the signal path to the receiver 21 from the slave station S exceeds that from the master station M by a distance that is represented by the time difference delta $t$ ($\Delta t$) indicated by the line 32 in Fig. 3, since both signals start exactly in phase and travel at the same rate of speed. At the midline between the stations M and S the receiver 21 would be between and equidistant from both of the stations and hence the signals from the stations would arrive at the midline simultaneously.

At a particular frequency within the operative range the value $\Delta t$ will be such that complete cancellation, as represented in Fig. 4, will occur. To locate this frequency the tuned circuit frequency knob 23 is adjusted within a range indicated by the range knob 24, until the voltmeter 26 indicates a null reading. This particular frequency is then converted into terms of $\Delta t$ for the identification of the particular hyperbolic line, such as line 15 in Fig. 1, or the tuned circuit may, if desired, be calibrated to read values of $\Delta t$ directly in microseconds. The determination is made through the mathematical relationship $f \times 2\Delta t = 10^6$ microseconds, where $f$ is expressed in cycles per second and $\Delta t$ is in seconds, or in microseconds since 1 second is equal to $10^6$ microseconds. This time difference $\Delta t$ is different for each of the hyperbolic lines in the family of lines between the pair of stations M and S, so that each line has an individual, different and characteristic delta $t$ value.

In Fig. 5 of the drawings, cancellation of the signals 10' and 10'' from the two stations M and S, respectively, at a frequency of 100 cycles per second, occurs in ½₀₀ second and occurs when the signals are displaced exactly 180° from each other. This situation exists at but one of the delay lines between stations M and S for the frequency of 100 cycles per second. In a similar manner, in Fig. 6 at 200 cycles per second, cancellation of the sinusoidal signals 14 and 14' occurs in ¼₀₀ second and only at another particular delay line between the stations M and S. As illustrated in Fig. 7 of the drawings, this occurrence of signal cancellation provides a curve 17 that, at infinite frequency, asymptotically approaches the midline 18 between the stations M and S, and that shows decreasing frequency with increase in time. This curve 17 indicates in general that $\Delta t$ has its smallest values nearest the midline 18 and has its largest values nearest the stations M and S. Fig. 8 indicates relative lines of signal travel between a pair of stations M' and S' with equal reception times occurring only along the midline 18'.

Upon the premise that the function of time according to which the modulating signals are varied at the two transmitters is a sine function, the audio modulating frequencies of stations M and S, that appear in the output from the receiver 21, will vary between the minimum and maximum values of 100 cycles per second and 5,000 cycles per second, as indicated in Fig. 3. Since the audio modulated signals from stations M and S are transmitted exactly in phase, there appears at the receiver 21 a null signal that depends upon the signal cancellation at a time delay that is common to both signals and that depends upon the difference in the distances traveled by the two signals.

With further reference to Fig. 4, null signal occurs in the output from the receiver 21 when the delay $\Delta t$ is an amount equal to one-half the period of the wave, or in mathematical symbols $P = 2\Delta t$, where P is the period or audio modulation wave length and $\Delta t$ is the time displacement in seconds, or in microseconds, of the signal from the master and slave stations at a predetermined frequency.

Null signals appear at the voltmeter 26 at a frequency that bears an inverse ratio to the period P or $$P = \frac{1}{f}$$

Since P also equals $2\Delta t$, then $$2\Delta t = \frac{1}{f} \text{ or } f = \frac{1}{2\Delta t} \text{ in seconds}$$

One second is $10^6$ microseconds and hence $$f = \frac{10^6}{2\Delta t} \text{ in microseconds}$$

or $$\Delta t = \frac{10^6}{2f} \text{ microsends}$$

With reference to Figs. 5 and 8, inclusive, of the drawings, for an audio modulation of 100 cycles per second, $P = \frac{1}{100}$ or in ½₀₀ of one second, or in 5,000 microseconds, cancellation, or 180° phase shift between signals, would occur at one particular hyperbolic line. Similarly in Fig. 6, for an audio modulation of 200 cycles per second, where $P=\frac{1}{200}$ then cancellation would result in $\frac{1}{400}$ second, or in 2500 microseconds, and would identify a second hyperbolic line. Additional hyperbolic lines would be similarly identified up to the frequency of 5,000 cycles per second where $P=\frac{1}{5,000}$ and where cancellation would result in $\frac{1}{10,000}$ second, or in 100 microseconds. Since $P=2\Delta t$, for a frequency of 100 cycles per second, cancellation would occur at 2500 microseconds=$\Delta t$; at 200 cycles per second $\Delta t=1250$ microseconds; and at 5,000 cycles per second $\Delta t=50$ microseconds. Each of these values of $\Delta t$ then identifies a particular hyperbolic line, with the 50 microseconds $\Delta t$ line near the midline 18' between stations M' and S' and with the 2500 microseconds $\Delta t$ line near one of the stations, as indicated in Figs. 7 and 8.

Null readings on the meter 26 also may be given by odd multiples of the lowest frequency at which cancellation occurs, which also will be 180° out of phase. For this reason the lowest frequency at which a null reading is obtained should be sought in determining the value of $\Delta t$.

Fig. 9 is a block and schematic diagram of means for directing the flight path of an aircraft automatically along one of the $\Delta t$ hyperbolic lines between a pair of master and slave stations. The equipment illustrated in Fig. 9 comprises a receiver 21', tuned circuit 22', rectifier 25' and relay 27, optionally with a voltmeter 26'. The equipment primed is comparable with the corresponding unprimed equipment in Fig. 1. The rectifier 25' comprises a pair of tuned circuits 33 and 34 and a pair of full wave rectifiers 35 and 36 connected as shown. The pair of rectifiers 35 and 36 have a resistor 37 shunted by a capacitor 38 connected across their direct current output contacts. A pair of relay windings 39 and 40 are adapted to be oppositely polarized from the rectifier 25' to attract an armature 41 against the yielding opposition of a coil spring 42 to engage a relay contact 43 or 44.

Operatively, a particular delta $t$ delay line approximately along which the flight of the aircraft is to be directed is located and the dials 23' and 24' on the tuned circuit 22' are set to the frequency or to the microseconds of that delay line. The two tuned circuits 33 and 34 are separately tuned to resonant frequencies that differ by equal small amounts upon opposite sides of the resonant frequency to which the tuned circuit 22' is adjusted.

The outputs from the tuned circuits 33 and 34 are applied separately for full wave rectification to the pair of rectifiers 35 and 36 that are connected in opposite polarity and in series across the load impedance 37 shunted by the capacitor 38 that in turn has the pair of polarized relay windings 39 and 40 connected across its plates. In the presence of a relative resultant field strength impressed by the relay windings 39 and 40 upon the relay armature 41, the armature 41 is attracted toward one or the other of the relay terminals 43 or 44. In the event the field strengths in the relay windings 39 and 40 just balance each other, the relay spring 42 maintains the relay armature 41 out of engagement with either of the relay contacts 43 or 44.

In the event that the output from one tuned circuit 33 or 34 exceeds the output from the other tuned circuit, then a voltage appears across the load impedance 37 and the relay armature 41 will be caused to engage one of the contacts 43 or 44 that, through an autopilot or the like, deflects the aircraft rudder, not shown, and brings the aircraft back to its flight course along the particular delay line for which the knobs 23' and 24' on the tuned circuit 22' are set.

The signal phenomena involved in the operation of the circuit shown in Fig. 9 is represented in Figs. 10 to 17, inclusive, of the accompanying drawings. On the premise that the delay line along which an aircraft is to be flown is that for which the value of $\Delta t$ is 1,000 microseconds then by the equation $$f=\frac{10^6}{2\Delta t},\ f=\frac{10^6}{2000}=500\ \text{cycles per second}$$

at which frequency master and slave signal cancellation will occur.

Signals from the master and slave stations and intercepted by the mobile station receiver 21' maintain a potential in the output therefrom at all times except for the particular situation where input signal cancellation occurs, as indicated at 500 cycles per second by receiver output curve 45 in Fig. 10 of the drawings. At the particular frequency at which the output of the receiver 21' drops, the curve 46 of the tuned circuit 22' is materially increased in amplitude, as indicated in Fig. 11 of the drawings. The combined effect of the receiver output curve 45 and the tuned circuit characteristic curve 46 upon the output from the tuned circuit 22' for particular circumstances are shown in Figs. 12, 13 and 14 of the drawings.

Fig. 12 of the drawings, represents the situation where thee aircraft or remote station is on course along the 500 cycles per second or 1,000 microseconds delay line. In this situation the receiver output curve 45 and the tuned circuit characteristic curve 46 are both at optimum deflection at 500 cycles per second and hence the tuned circuit output curve 47 is symmetrical on both sides of 500 cycles per second frequency.

Fig. 13 represents the situation where the aircraft or mobile station is off course in one sense, as a result of which the receiver output curve 45 drops to its minimum voltage at a position to the left of the frequency of 500 cycles per second, at which the tuned circuit 22' is set. The resultant tuned circuit output curve 47, that in magnitude is the difference between the curves 45 and 46, arrives at a null or signal cancellation at a frequency somewhat below the 500 cycles per second at which the tuned circuit 22' is adjusted. This signal situation results in an output from the tuned circuit 22', that is unbalanced to the extent of the departure of the curve 47 null from the setting of the knobs 23' and 24' on the tuned circuit 22'.

Fig. 14 represents the situation where the mobile aircraft has departed from its prescribed flight path in the sense opposite to that indicated in Fig. 13 and hence the cancellation of the signals from the stations M and S occurs at a frequency above 500 cycles per second. Under the situation illustrated in Fig. 12 the equipment in Fig. 9 continues the flight path of the aircraft straight ahead. Under the situation illustrated in Fig. 14 the equipment in Fig. 9 alters the flight path of the aircraft in an opposite sense from the alteration in flight path to correct the situation in Fig. 13.

The signal phenomena indicated in Figs. 15, 16 and 17 of the accompanying drawings pertain to the application of the tuned circuit 22' to the pair of series connected tuned circuits 33 and 34 that are tuned to resonate at frequencies slightly above and below the frequency at which the tuned circuit 22' resonates.

Fig. 15 represents the condition at the rectifier 25' when the aeroplane is on course, such that the signal situation is analogous to that illustrated in Fig. 12 at the output from the tuned circuit 22'. The signal curve 47 is as before the output from the tuned circuit 22 and is symmetrical on both sides of the 500 cycles per second frequency delay line, as also are the rectifier tuned circuit 33 characteristic curve 51 and the rectifier tuned circuit 34 characteristic curve 53. Under these conditions the flight path of the aircraft continues straight ahead on course, since the tuned circuit 33 output curve 50 and the tuned circuit 34 output curve 52 are symmetrical and of equal voltage output to the load impedance 37 and to the relay windings 39 and 40, respectively. The curve 50 is the difference between the curves 47 and 51 above 500 cycles per second and the curve 52 is the difference between the curves 47 and 53 below 500 cycles per second. Since the outputs from the tuned circuits 33 and 34 are of equal voltage and amplitude no voltage is impressed across the load impedance 37 and the relay armature 41 remains out of engagement with both contacts 43 and 44.

Figs. 16 and 17 represent a signal situation where the aircraft has departed in one sense from its prescribed flight path along the 500 cycles per seconds frequency delay line. In Fig. 16 the tuned circuit 33 characteristic curve 51 has been deleted for simplicity of illustration, but its effect upon its associated curves has been taken into consideration. The curve 55 in Fig. 16 is the curve of a portion of the output from the tuned circuit 22' that is applied to the rectifier tuned circuit 34. The curve 56 in Fig. 17 is the curve of a portion of the output from the tuned circuit 22' that is applied to the other rectifier tuned circuit 33. Dominance of signal voltage from tuned circuit 33, indicated by line 50, over that from tuned circuit 34, indicated by line 52, across the resistor 37 causes current flow through the relay windings 39 and 40 in one direction and actuates the armature 41 toward the corresponding one of the contacts 43 or 44 and causes the aircraft to be turned toward its prescribed course. Curves for the aircraft off course in the opposite sense are not shown but would be the reverse of those shown in Figs. 16 and 17.

In conformity with the foregoing analysis, the equipment shown in Fig. 9, with the relay contacts 43 and 44 connected to an automatic pilot, serves to trim the rudder of the aircraft to a predetermined flight course along a selected delay line between a pair of master and slave stations appropriately situated on a geographical map.

It will be understood that the apparatus disclosed herein has been submitted for the purposes of describing and illustrating an operative embodiment of the present invention and that similarly operating modifications may be made therein without departing from the scope of the present invention.

What I claim is:

1. A navigation system for locating the position of a mobile station, comprising a master station transmitting a constant frequency carrier continuously modulated with a varying audio frequency, a slave station transmitting a constant frequency carrier continuously modulated with a varying audio frequency in simultaneous and in exact phase relation as transmitted with the master station modulation, receiver means at the mobile station receiving the modulated carrier from both said master and slave stations, indicator bearing adjustable tuned circuit means receiving its input from said receiver means, and null signal indicator means responsive to the output of said tuned circuit means for indicating the frequency at which cancellation of the modulations received at said mobile station from said master and slave stations occurs from which a delay line of known geographical location may be identified as the position of the mobile station.

2. A radio navigating system for determining a hyperbolic line of position on a Loran grid of known geographical position comprising a master transmitting station and a slave transmitting station spaced from said master station, said stations having a known position with respect to the Loran grid, and each of said stations transmitting at the same carrier frequency modulated in phase with a signal, the frequency of which varies cyclically over a predetermined frequency range, a mobile station positioned within said Loran grid and having a receiver adapted to simultaneously receive the signals transmitted from said master and slave stations and means connected to the output of said receiver for scanning the frequency spectrum of the receiver output to determine the frequency at which the output is a minimum which frequency is a measure of the time delay in the transmission of signals from the master and slave stations respectively.

LEO MACKTA.

REFERENCES CITED

The following references are of record in the file of this patent:

UNITED STATES PATENTS

| Number | Name | Date |
| --- | --- | --- |
| 1,919,556 | Jacquemin | July 25, 1933 |
| 1,942,262 | Shanklin | Jan. 2, 1934 |
| 1,995,285 | Albersheim et al. | Mar. 26, 1935 |
| 2,407,287 | Labin | Sept. 10, 1946 |
| 2,413,620 | Guanella | Dec. 31, 1946 |
| 2,413,694 | Dingley | Jan. 7, 1947 |

FOREIGN PATENTS

| Number | Country | Date |
| --- | --- | --- |
| 811,700 | France | Jan. 23, 1937 |
| 672,104 | Germany | Feb. 22, 1939 |